Oct. 3, 1950 S. D. RUSSELL 2,524,233
PICK-UP DEVICE FOR BALERS
Original Filed April 19, 1941 3 Sheets-Sheet 1

INVENTOR.
Stanley D Russell
BY
Emerson B Donnell
ATTORNEY.

Oct. 3, 1950  S. D. RUSSELL  2,524,233
PICK-UP DEVICE FOR BALERS
Original Filed April 19, 1941  3 Sheets-Sheet 2

INVENTOR
Stanley D. Russell
BY
Emerson B. Donnell
ATTORNEY.

Patented Oct. 3, 1950

2,524,233

UNITED STATES PATENT OFFICE 2,524,233

PICKUP DEVICE FOR BALERS

Stanley D. Russell, Racine, Wis., assignor to J. I. Case Company, Racine, Wis., a corporation Original application April 19, 1941, Serial No. 389,396, now Patent No. 2,362,861, dated November 14, 1944. Divided and this application November 11, 1944, Serial No. 563,035

7 Claims. (Cl. 56—364)

The present invention relates to balers and an object thereof is to generally improve the construction and operation of machines of this class.

A further object is to provide such a machine of larger capacity, lighter weight and lower cost than similar machines of comparable dimensions heretofore known.

A further object is to provide new, novel and improved pickup means for a baler.

Further objects will be apparent from the following description and drawings in which:

Fig. 4 is a sectional view taken on the line 4—4 of Fig. 1.

Similar reference characters have been applied to the same parts throughout these drawings and the specification.

The machine of the present invention is generally similar to that shown and described in pending application, Serial No. 389,396, filed April 19, 1941 and patented November 14, 1944, No. 2,362,861, of which this application is a division.

Figure 1:
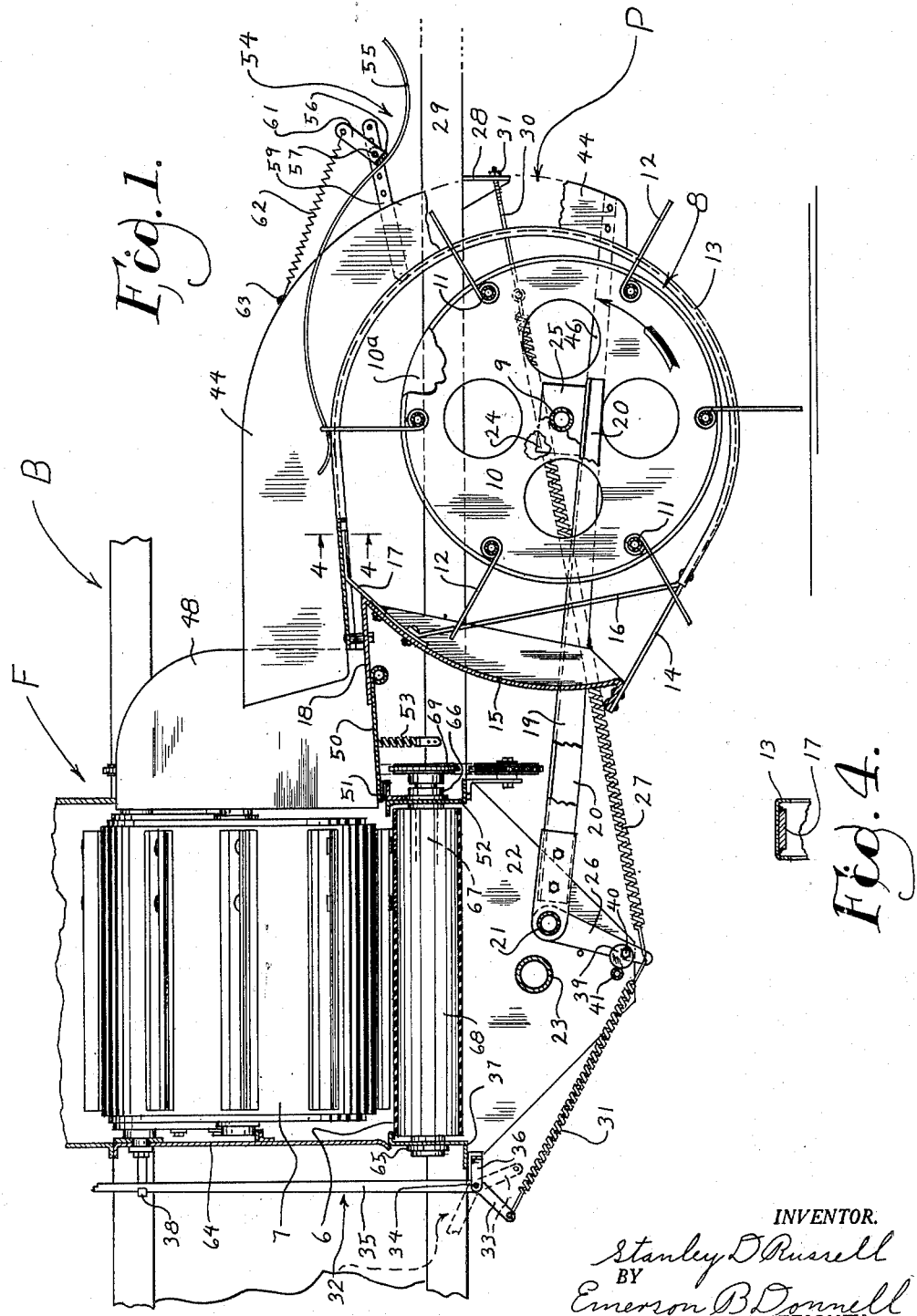
Figure 1 is a vertical longitudinal sectional view through the pick-up and feeding mechanism of so much of a pickup baler as necessary to illustrate the invention.

As seen in Fig. 1, the illustrative machine includes a baler generally designated as B, a pickup generally designated as P and feeding means F, the remaining parts of the machine being of the form fully disclosed in the above mentioned copending application and forming no part of the present invention.

Pickup P operates to elevate material from the ground onto an apron 6.

Apron 6 conveys the material toward baler B and beneath rotating drum, roller or feeder 7. Apron 6 and feeder 7 urge the material into the baling chamber through an opening in the side thereof as fully disclosed in the above identified co-pending application, now Patent No. 2,362,861 and suitable dividing means not shown, operates to separate the resulting bales in a manner forming no part of the present invention but fully disclosed and claimed in said Patent No. 2,362,861.

The present invention is concerned particularly with the pickup means which include the cylinder generally designated as 8, Fig. 1, comprising a shaft 9, a plurality of heads as 10 and 10a and a series of elements 11—11 in the present instance tubular in form connecting the spaced heads. Elements 11—11 in the present instance may be rigidly attached to head 10a in any suitable or well-known manner and are provided with pickup teeth 12—12 extending therefrom in fixed relation as for example radially, the teeth being yieldable or yieldably mounted on the elements if desired. Cylinder 8 rotates in a counterclockwise direction as seen in Fig. 1 during progress of the machine from left to right. Teeth 12 accordingly can be made to comb the ground and tend to raise material in front of the cylinder up and over the same and to the rear thereof.

Figure 2:
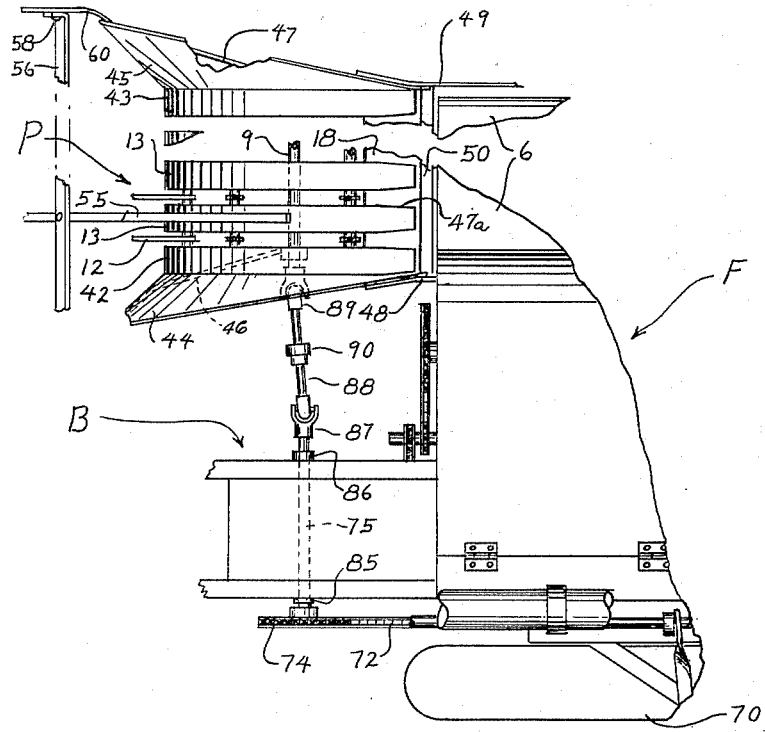
Fig. 2 is a plan view of a portion of an illustrative machine with parts broken away and embodying the invention.

As seen in Fig. 2, teeth 12 are arranged in a series of planes at right angles to shaft 9 so as to provide pathways about cylinder 8 between adjacent rows of teeth. Strippers 13—13 are arranged between the rows of teeth starting at a point slightly to the rear of cylinder 8 and extending downwardly and forwardly, and then upwardly and rearwardly about the cylinder, approaching the cylinder closely at a point beneath and gradually receding from the cylinder. At a point substantially above the cylinder, the strippers will have receded a distance substantially equal to the length of teeth 12. Thus, as cylinder 8 rotates, the teeth project from strippers 13 the maximum amount at the bottom of the pickup but gradually recede within the strippers until they disappear entirely at a point slightly to the rear of the highest point. They thus operate to raise the material to be baled but disengage therefrom at the point of greatest elevation and they do this without the benefit of any mechanism whatever within cylinder 8.

Strippers 13 are attached to brackets 14 spaced at proper intervals along a plate 15 and braced as by struts 16 also connected to plate 15. Strippers 13 at their upper ends are supported as by brackets 17 and extend rearwardly for a distance over a rearward extension 18 of plate 15. Strippers 13 may be of any suitable form but in the present instance are of channel section as indicated in Fig. 4.

Plate 15 constitutes part of a framework for supporting cylinder 8 and its attached parts and serves as a spacing member for forwardly reaching struts or arms 19 and 20 fixed with a shaft 21 journaled in brackets as 22 forming part of the baler structure and carried by an axle 23, shaft 21 constituting a pivot for swingably supporting said struts or arms 19 and 20. Struts 19 and 20 carry respectively bearings 24 and 25 in which is journaled above mentioned shaft 9. The entire pickup unit may accordingly be raised and lowered about shaft 21 by oscillating said shaft. Shaft 21 also has an arm 26 extending downwardly and rearwardly therefrom and to which is connected a spring 27 tensioned between it and a bracket 28 fixed with an angle iron 29 forming part of above mentioned baler B. An adjusting bolt 30 and a nut 31 are preferably interposed between the spring and bracket 28 for adjusting the pull of spring 27. The force of said spring tends to cause counterclockwise rotation of shaft 21 and accordingly causes a lifting force in arms 19 and 20, and in practice this pull is great enough to overcome the weight of the parts and cause them to be raised to the extent permitted by the associated construction.

A second spring 31 also connected to arm 26 extends rearwardly to a lever 32 having an arm 33, a fulcrum 34 and an arm 35, fulcrum 34 being supported as by a bracket 36 from a Z bar 37 forming part of above mentioned feeder F. In the dotted position of lever arm 33, spring 31 is relaxed sufficiently so that spring 27 may raise the pickup for transportation purposes, but for operation lever arm 35 is placed in the full line position and retained as by a hook or detent 38, thus placing lever arm 33 in full line position and exerting tension on spring 31. The latter in conjunction with the weight of pickup P overcomes spring 27, pulling arm 26 backwardly and lowering struts 19 and 20 to place the pickup in operative position.

At a predetermined point, in the downward movement, a stop member 39 pivoted on a bolt 40 contacts a truss rod 41 primarily constituting a brace for feeder structure F. This limits the downward movement of pickup P by arresting rearward travel of arm 26. Stop member 39 is preferably adjustable, in the present instance being in the form of an eccentric pivoted on bolt 40 and clamped thereby in any desired relation to arm 26. As will be apparent, the adjusted working position of pickup P can be changed by loosening bolt 40 and shifting eccentric stop member 39 to a new position and clamping it in place by retightening the bolt. Other suitable or well-known stop means are contemplated, that shown being preferred as effective and inexpensive.

As above noted, strippers 13 are anchored to the extremities of plate 15. At the ends of cylinder 8, however, additional strippers as 42 and 43 are combined with flare sheets 44 and 45 mounted in the identical manner on plate 15 as by brackets 14 and 17, braces as 46 and 47 extending for example from bearings 24 and 25 to flare sheets 44 and 45 for steadying them against the additional weight.

Strippers 13, 42 and 43 extend rearwardly over plate extension 18 beyond brackets 17 and the ends of the strippers, as seen in Fig. 2, are tapered rearwardly somewhat at 47ª so that the slots resulting between the strippers increase slightly in width at the discharge ends thereof. For this reason, any material caught in the slots and urged rearwardly by the teeth 12 will tend to become released so that the slots will be cleared. Flare sheet 44 extends rearwardly within a guard sheet 48 carried by feeding mechanism F and flare sheet 45 extends in a similar manner inside of a guard sheet 49 also forming part of the feeding mechanism. Pickup P is therefore free to rise and fall while maintaining a substantially closed pathway or channel for picked up material which channel leads into the feeding mechanism. As seen in Fig. 1, a plate 50 is hinged at 51 to a Z bar 52 forming a part of above mentioned feed mechanism F and is pressed upwardly as by a spring 53 against the underside of rearward plate extension 18. This closes the space which would otherwise exist between extension 18 and Z bar 52. Plate 50 can rise and fall with pickup P and maintain the closed channel between the pickup and feeding mechanism.

Under some conditions a strong wind may tend to blow material being picked up out of the channel between flare sheets 44 and 45. Under other conditions, material may fail to follow fingers 12 and roll up ahead of the pickup. To counteract these tendencies, a hold-down generally designated as 54 is provided comprising a series of strips 55—55 fixed with a bar 56 pivoted as at 57 and 58 to brackets 59 and 60, carried in the present instance by flare sheets 44 and 45 respectively. Strips 55 extend rearwardly over strippers 13 and are yieldably pressed down against material moving over the pickup. An arm 61 extends upwardly from bar 56 and has a spring 62 extending rearwardly to an anchorage 63 on flare sheet 44, the tension of spring 62 tending to rotate bar 56 in a counterclockwise direction as seen in Fig. 1, thereby pressing strips 55 down against the material as above mentioned. Material once started under hold-down 54 cannot be blown away even by a strong wind and the cooperation between teeth 12 and hold-down 54 eliminates any tendency for material to roll up ahead of the pickup instead of traveling over onto the conveyor.

Feeding mechanism F cooperates with pickup P and has above mentioned guard sheets 48 and 49 and a back sheet 64 for preventing passage of material across the feeder and over the back thereof, and also for preventing access of wind to the material being baled. Z bars 37 and 52 together with bracket 22 constitute a framework for carrying a series of rollers supporting and actuating above mentioned apron 6. Z bars 37 and 52 carry bearings 65 and 66 of well-known type supporting a shaft 67, shaft 67 carrying a roller 68. Above mentioned apron 6 is trained about roller 68 and similar rollers not shown and may be of any suitable or well-known type in the present instance constituting a smooth wide web of suitable material such for example as rubber belting, although other frictional material may be substituted within the contemplation of the invention. Roller 68 is rotated from the baler mechanism by means of a sprocket 69 in a manner forming no part of the present invention and not necessary to disclose.

Figure 3:
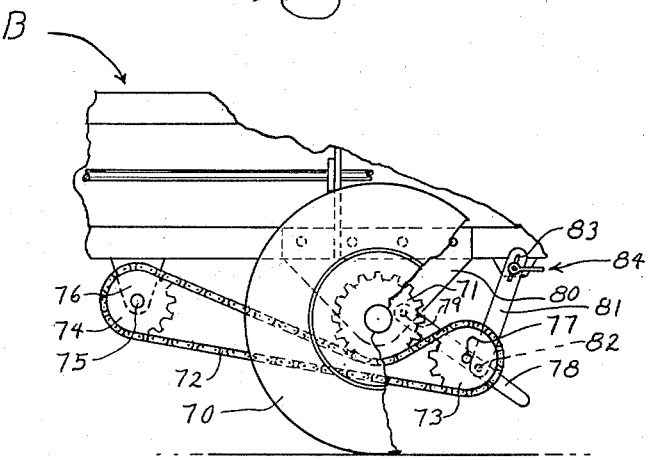
Fig. 3 is a left side elevation of the same with parts omitted and others broken away.

Pickup cylinder 8 under most conditions is driven from the ground as follows. A ground wheel 70, Fig. 3, carries a sprocket or the like 71 in the present instance the underside thereof engaging the upper run of a chain or the equivalent 72, extending between an idler sprocket 73 and a sprocket 74 fixed on a shaft 75, and journaled for support from a bracket 76 carried by bale chamber B. With this arrangement, clockwise rotation of sprocket 74, as seen in Fig. 3, is obtained from counterclockwise rotation of ground wheel 70, the normal direction of rotation resulting from forward movement of the baler. Sprocket 73 is journaled on a stud or the like 77 in the present instance fixed with a lever 78 pivoted at 79 to a bracket 80 supporting bale chamber B from wheel 70. Lever 78 may accordingly swing about pivot 79 for shifting sprocket 73 for adjusting the tension in chain 72. A strut 81 pivoted at 82 to lever 78, has a slotted connection at 83 with a clamping unit generally designated as 84. Loosening clamp 84 will provide for shifting of lever 78, the clamp being again tightened when the desired adjustment is reached.

Shaft 75 is journaled in bearings 85 and 86 as more particularly shown in Fig. 2 carried by bale chamber B and is fitted with a universal joint generally designated as 87 connecting an extensible shaft of suitable or well-known type 88 with above mentioned shaft 9 by means of a universal joint 89. A safety or overrunning clutch generally designated as 90 may be interposed if desired in shaft 88.

Figure 5:
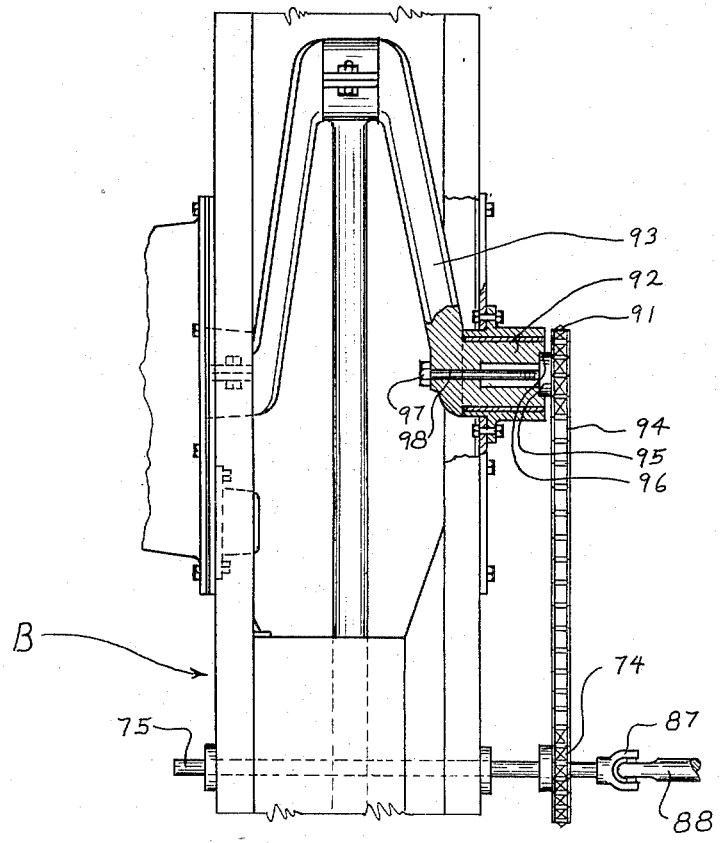
Fig. 5 is a plan view with parts broken away showing a modified driving arrangement.

Under some conditions, a ground drive for pickup P may be undesirable. With the disclosed structure, a power drive may be very readily obtained. As seen in Fig. 5, sprocket 74 may be removed from its position on shaft 75 and applied on the opposite side of bale chamber B. At the same time a sprocket 91 may be applied in any suitable manner to journal portion 92 of a crank shaft 93 constituting part of the baler B and actuated by any suitable source of power not shown, for example as disclosed in the above mentioned copending application. A chain 94 engages sprockets 74 and 91 whereupon operation of the crankshaft will cause rotation of pickup cylinder 8. Sprocket 91 may be fixed with journal portion 92 in any suitable or well-known manner, in the present instance having a hub portion 95 seated in a socket 96, a screw or the like 97 extending through a bore 98 and being engaged in sprocket 91. It is to be noted that the direction of rotation of crank shaft 93 corresponds to the correct direction of rotation of pickup cylinder 8 so that a very simple drive between the crankshaft and shaft 88 is sufficient.

The above being a complete description of an illustrative embodiment of the invention, what is claimed as new and desired to be secured by Letters Patent of the United States is:

1. In a pick-up device for a baler, said baler having a pivot thereon, an arm extending forwardly from the pivot, a pick-up cylinder journaled on the arm, a resilient element connected with said pivot and with the baler so as to exert a yielding turning effort thereon in a direction to raise said arm and pick-up cylinder, another resilient member connected with said pivot and arranged to oppose the first mentioned resilient element, and to overcome said first mentioned resilient element and swing said arm in a direction to cause lowering of said pick-up cylinder, mechanism for altering the force exerted by the second mentioned resilient element for overcoming said first mentioned resilient element to cause said pick-up unit to be lowered and an adjustable stop limiting the lowering movement for determining a lowered position of said pick-up cylinder clear of the ground.

2. In a pickup device for a baler, a pivot on the baler, an arm extending forwardly from the pivot, a pickup cylinder journaled on the arm, and a plurality of strippers disposed about the pickup cylinder for removing material picked up by the cylinder, a frame carried by the arm and connected in supporting relation to said strippers, a feeding device including an apron disposed rearwardly of said strippers, a plate supported by said frame rearwardly of said strippers and in position to receive material discharged from said strippers said plate being disposed between said strippers and said feeding apron, a second plate hinged to said feeding device, a resilient element urging said second plate into contact with the first mentioned plate, mechanism for raising and lowering said arm and adjustable stop means for determining a desired lowered position of said arm.

3. In a pickup baler, a baling machine having a supporting wheel in supporting relation thereto, a pickup cylinder spaced from said supporting wheel and extended laterally from said baling machine, a driving wheel fixed with said supporting wheel, an idler rotatably supported at one side of said driving wheel and spaced therefrom, a driving wheel supported for rotation at the opposite side of the first mentioned driving wheel and spaced therefrom, a driving connection from the last mentioned driving wheel to said pickup cylinder and a flexible driving element extended about said second mentioned driving wheel in driving relation thereto and about said idler forming a loop thereabout, said first mentioned driving wheel being engaged with said flexible driving means on the outer side of the loop formed thereby in traversing said second mentioned driving wheel and said idler, whereby said second mentioned driving wheel and said pick-up cylinder are rotated in the reverse direction as compared with said supporting wheel.

4. In a pick-up device for a baler, a pivot on the baler, an arm extending forwardly from the pivot, a pick-up cylinder journaled on the arm, and a plurality of strippers disposed about the pick-up cylinder for removing material picked up by the cylinder, a frame carried by the arm and connected in supporting relation to said strippers, a plate on said frame, a feeding device including an apron disposed rearwardly of said strippers and in position to receive material discharged from said strippers, said plate being disposed between said strippers and said feeding apron, a second plate hinged to said feeding device, a resilient element urging said second plate into contact with the first mentioned plate and mechanism for raising and lowering said arm.

5. In a pick-up baler for a baling machine, wheels for supporting the baling machine for travel over the ground, a substantially rigid feeder element extended at one side of the baler and including a rockable pivot, a forwardly extending arm fixed in relation to the pivot, a pick-up supported from the arm and means for controlling the rockable pivot for floatingly supporting the pick-up including an arm extending downwardly from said pivot, a tension spring connected to the arm and stressed to exert a force thereon sufficient to raise the pick-up, and a second tension spring engaged with said arm in opposition to said tension spring, and operator actuated mechanism for controlling the tension of said second tension spring for overcoming the first mentioned tension spring and causing said pick-up to descend to a lowered position.

6. A device of the character set forth in claim 4 characterized by an adjustable stop for determining a lowered position of said pick-up clear of the ground.

7. In a pick-up baler for a baling machine, wheels for supporting the baling machine for travel over the ground, a substantially rigid feeder element extended at one side of the baler and including a truss rod, a rockable pivot on the feeder, a forwardly extending arm fixed in relation to the pivot, a pick-up supported from the arm and means for controlling the rockable pivot for floatingly supporting the pick-up including an arm extended downwardly from said pivot, a tension spring connected to the arm and stressed to exert a force thereon sufficient to raise the pick-up, a second tension spring engaged with said arm in opposition to the first mentioned tension spring, and operator actuated mechanism for controlling the tension in said second tension spring for overcoming the first tension spring and causing said pick-up to descend to a lowered position and a stop portion on the downwardly extending arm in position to engage said truss rod to limit the movement of said arm and establish a lowered position of said pick-up clear of the ground.

STANLEY D. RUSSELL.

REFERENCES CITED

The following references are of record in the file of this patent:

UNITED STATES PATENTS

| Number | Name | Date |
|---|---|---|
| 891,008 | Robson et al. | June 16, 1908 |
| 1,979,974 | MacGregor | Nov. 6, 1934 |
| 2,256,830 | Johnson | Sept. 23, 1941 |
| 2,259,908 | Raney | Oct. 21, 1941 |
| 2,293,679 | Barker | Aug. 18, 1942 |
| 2,362,861 | Russell | Nov. 14, 1944 |
| 2,378,107 | Russell | June 12, 1945 |